(12) United States Patent
Shibata

(10) Patent No.: US 12,490,099 B2
(45) Date of Patent: Dec. 2, 2025

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: BROTHER KOGYO KABUSHIKI KAISHA, Nagoya (JP)

(72) Inventor: Hiroshi Shibata, Yatomi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 477 days.

(21) Appl. No.: 18/172,445

(22) Filed: Feb. 22, 2023

(65) Prior Publication Data
US 2023/0276241 A1    Aug. 31, 2023

(30) Foreign Application Priority Data
Feb. 28, 2022    (JP) .................................. 2022-029601

(51) Int. Cl.
*H04W 12/50*    (2021.01)
*H04W 12/0471*    (2021.01)
*H04W 12/06*    (2021.01)
*H04W 76/10*    (2018.01)

(52) U.S. Cl.
CPC ....... *H04W 12/50* (2021.01); *H04W 12/0471* (2021.01); *H04W 12/06* (2013.01); *H04W 76/10* (2018.02)

(58) Field of Classification Search
CPC . H04W 12/50; H04W 76/10; H04W 12/0471; H04W 12/06
See application file for complete search history.

(56) References Cited

U.S. PATENT DOCUMENTS

| | | | | |
|---|---|---|---|---|
| 2019/0215878 | A1* | 7/2019 | Goto | G06K 19/06037 |
| 2019/0356482 | A1* | 11/2019 | Nix | H04W 12/041 |
| 2020/0220718 | A1* | 7/2020 | Tsuji | H04W 48/16 |
| 2021/0282011 | A1* | 9/2021 | Tachibana | H04W 12/06 |
| 2021/0385778 | A1* | 12/2021 | Ahn | H04W 60/00 |
| 2021/0399830 | A1* | 12/2021 | Nakajima | H04W 16/10 |
| 2022/0353679 | A1* | 11/2022 | Shibata | H04W 12/06 |
| 2022/0400118 | A1* | 12/2022 | Jiang | G06F 21/45 |

(Continued)

FOREIGN PATENT DOCUMENTS

JP    2020-088620 A    6/2020

*Primary Examiner* — Khawar Iqbal
(74) *Attorney, Agent, or Firm* — Merchant & Gould P.C.

(57) ABSTRACT

A communication device may execute a first process according to a Device Provisioning Protocol (DPP) scheme, execute a second process according to a first wireless connection scheme different from the DPP scheme; and shift a state of the communication device. The first process may include, under a situation where the state of the communication is a first state, receiving an authentication request from a first external device, sending an authentication response to the first external device, and establishing a first wireless connection with a second external device. A communication device may be configured to shift the state of the communication device from the first state to a second state after the authentication response has been sent to the first external device and before the first wireless connection is established with the second external device.

12 Claims, 7 Drawing Sheets

(56) References Cited

U.S. PATENT DOCUMENTS

| | | | |
|---|---|---|---|
| 2023/0138231 A1* | 5/2023 | Sumita | H04W 48/20 |
| | | | 370/310 |
| 2023/0289116 A1* | 9/2023 | Tsuji | H04W 12/50 |
| 2024/0056808 A1* | 2/2024 | Kim | G06F 21/44 |
| 2024/0196451 A1* | 6/2024 | Nakajima | H04W 72/56 |
| 2024/0323229 A1* | 9/2024 | Bernsen | H04W 12/35 |

* cited by examiner

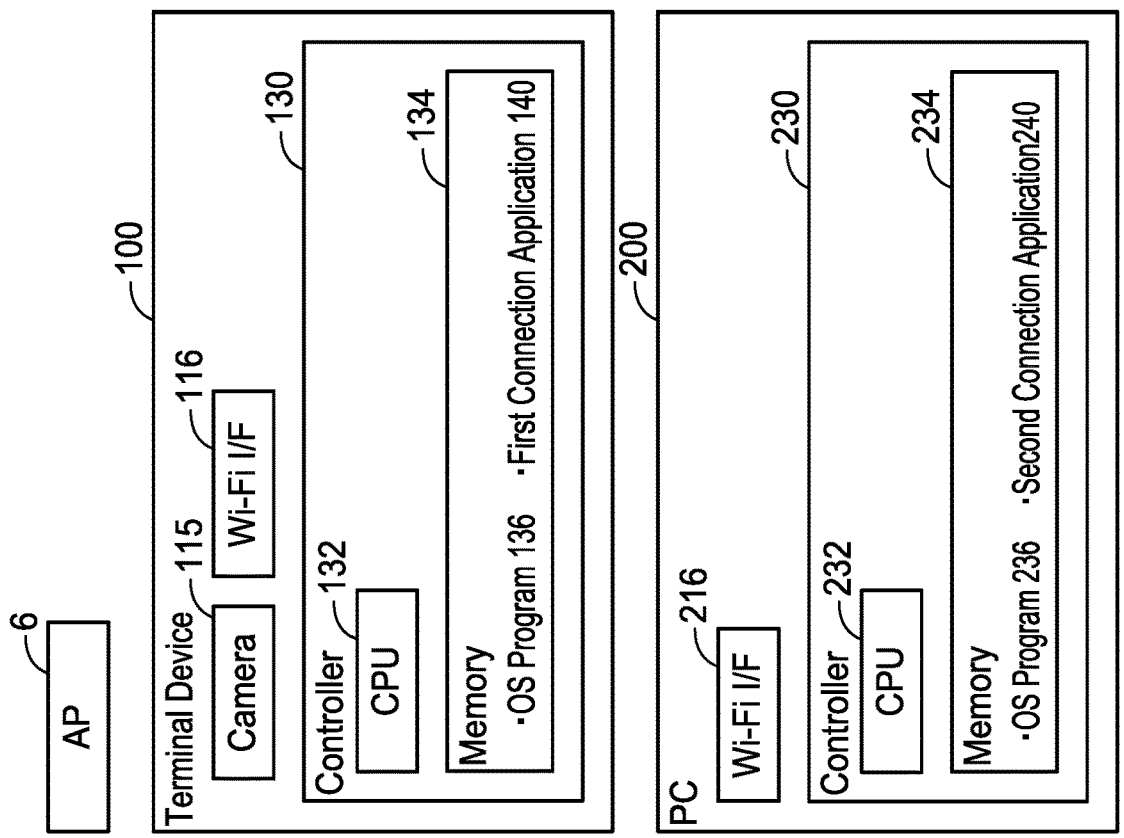
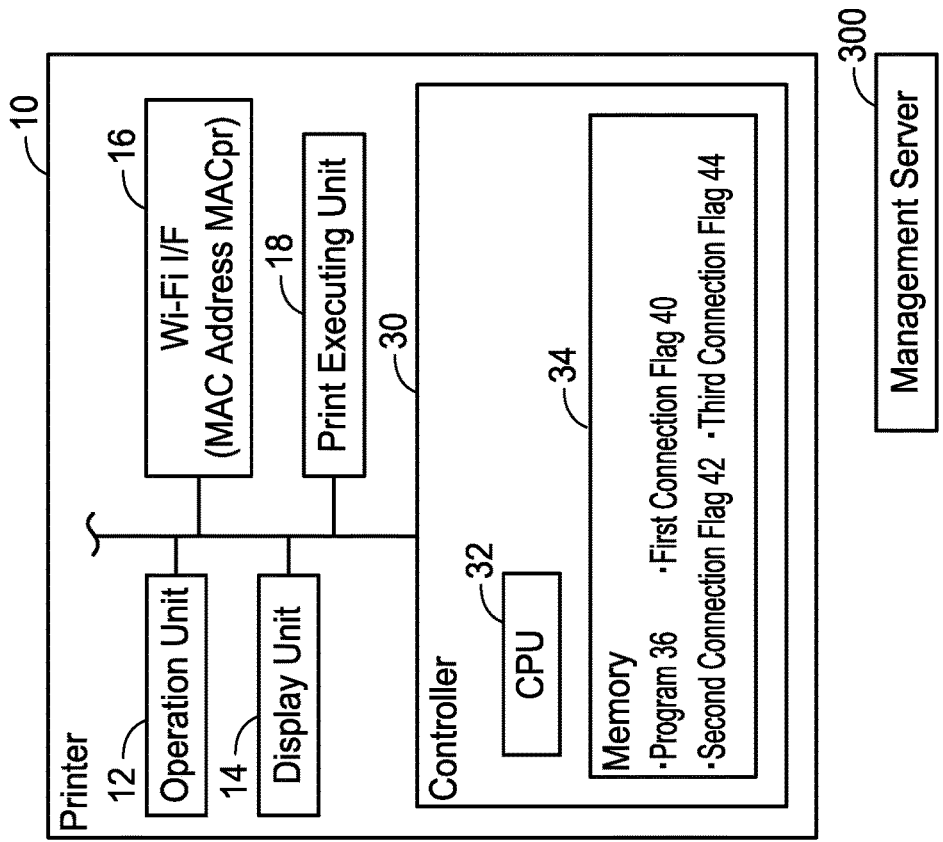
FIG. 1

COMMUNICATION DEVICE AND NON-TRANSITORY COMPUTER-READABLE RECORDING MEDIUM STORING COMPUTER-READABLE INSTRUCTIONS FOR COMMUNICATION DEVICE

REFERENCE TO RELATED APPLICATIONS

This application claims priority from Japanese Patent Application No. 2022-029601 filed on Feb. 28, 2022. The entire content of the priority application is incorporated herein by reference.

BACKGROUND ART

A communication system including two communication devices is known. The communication devices are each capable of establishing wireless connection with the other communication device in accordance with Device Provisioning Protocol (DPP) scheme, and also capable of establishing wireless connection with the other communication device using a PIN scheme of Wi-Fi Protected Setup (WPS) standards. When the communication device receives a code exchange request or a response to the code exchange request that it had sent under a state where PKEX process and WPS process have been started, the communication device stops the ongoing WPS process. Then, the communication device establishes the wireless connection with the other communication device in accordance with the DPP scheme.

DESCRIPTION

The above-mentioned communication device stops the WPS process in the case where it receives the code exchange request or the response to the code exchange request the device itself had sent from the other communication device. Even when the communication device has received the code exchange request or the response to the code exchange request from the other communication device, there still may be a case where establishment of wireless connection with the other device according to the DPP scheme fails. If the WPS process is stopped, it then becomes impossible to establish wireless connection with the other wireless device according to the WPS scheme after the failure of the establishment of wireless connection with the other device according to the DPP scheme. Due to this, it is desirable to stop the WPS process at an appropriate timing.

The present disclosure provides an art configured to appropriately perform a process according to the DPP scheme and a process according to the first wireless connection scheme.

The disclosure herein discloses a communication device. The communication device may comprise: a controller configured to: execute a first process according to a Device Provisioning Protocol (DPP) scheme; execute a second process according to a first wireless connection scheme different from the DPP scheme; and shift a state of the communication device. The first process may include: under a situation where the state of the communication is a first state of being able to establish wireless connection with a different device according to the DPP scheme and being able to establish wireless connection with a different device according to the first wireless connection scheme, receiving an authentication request in which a public key of the communication device is used from a first external device; in a case where the authentication request is received from the first external device, sending an authentication response to the first external device; and in a case where the authentication response is sent to the first external device, establishing first wireless connection with a second external device. The controller may be configured to shift the state of the communication device from the first state to a second state after the authentication response has been sent to the first external device and before the first wireless connection with the second external device is established. The second state may be a state of being able to establish wireless connection with a different device according to the DPP scheme and being unable to establish wireless connection with a different device according to the first wireless connection scheme.

According to the above configuration, the communication device is able to execute the process according to the DPP scheme and the process according to the first wireless connection scheme. The communication device is configured to shift the state of the communication device from the first state to the second state after the authentication response has been sent to the first external device and before the first wireless connection is established with the second external device. That is, the communication device enters the state of being unable to establish wireless connection with another device after the authentication response has been sent to the first external device and before the first wireless connection is established with the second external device. A chance of failure in establishing the first wireless connection between the communication device and the second external device according to the DPP scheme is lower after the authentication response has been sent to the first external device than before the authentication response is sent to the first external device. Due to this, the process according to the DPP scheme is suitably executed by the state of the communication device having shifted from the first state into the second state, by which the first wireless connection is established between the communication device and the second external device. Also, the communication device is able to appropriately execute the process according to the first wireless communication scheme and to establish wireless connection with the second external device according to the first wireless connection scheme if the establishment of the first wireless connection with the second external device according to the DPP scheme fails before the state of the communication device has shifted from the first state to the second state. Accordingly, the communication device is able to appropriately execute the process according to the DPP scheme and the process according to the first wireless connection scheme.

A non-transitory computer-readable recording medium storing computer-readable instructions for the above-mentioned communication device and a method executed by the communication device are also novel and useful. A system comprising the above-mentioned communication device, the first external device, and the second external device is also novel and useful.

FIG. 1 illustrates a configuration of a communication system.

Figure 2:
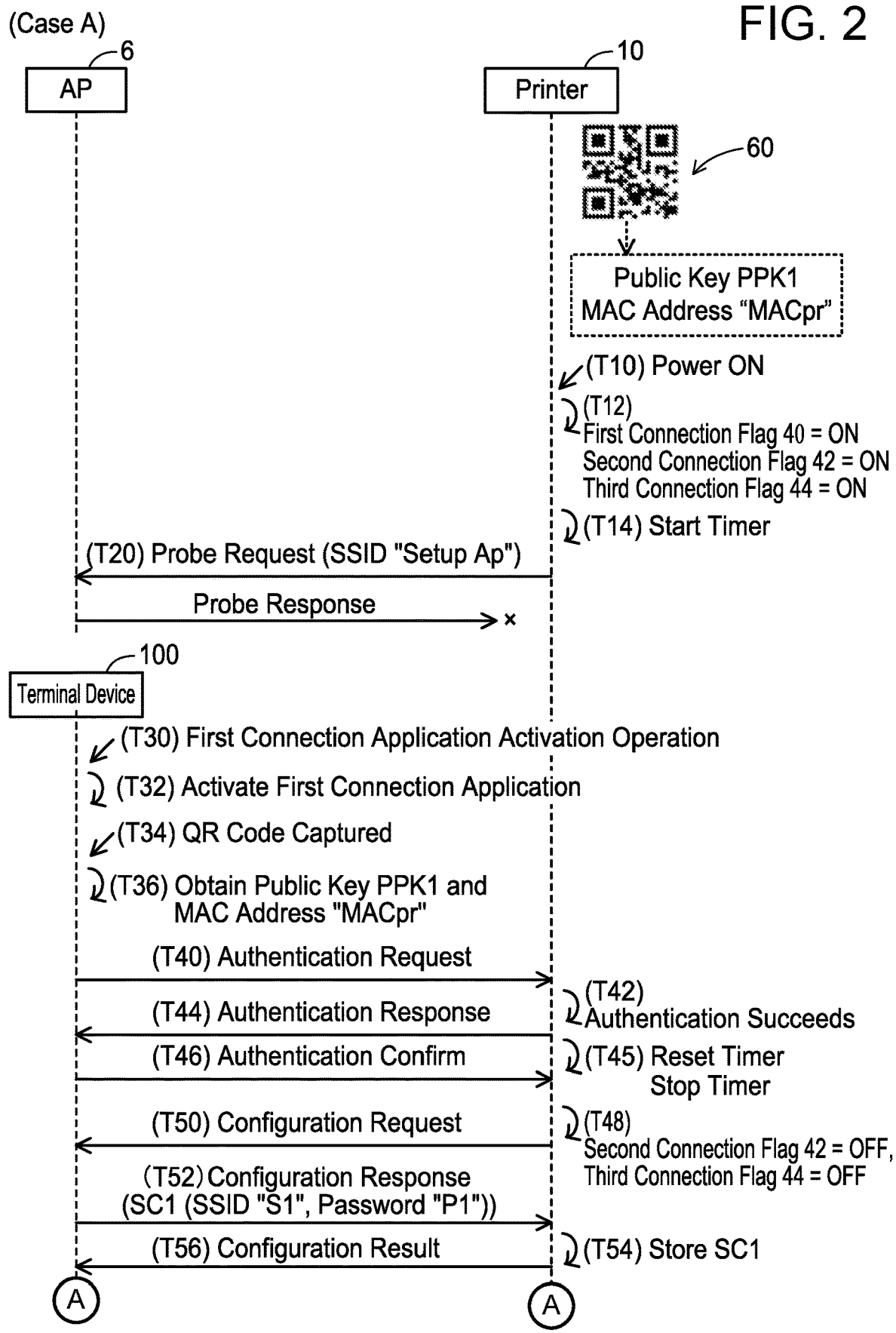
FIG. 2 illustrates a sequence diagram of Case A in which Wi-Fi connection is established between a printer and an AP according to DPP scheme.

FIRST EMBODIMENT (Configuration of Communication System 2: FIG. 1)

As shown in FIG. 1, a communication system 2 comprises an access point (hereafter, "AP") 6, a printer 10, a terminal device 100, a PC 200, and a management server 300.

(Configuration of Printer 10: FIG. 1)

The printer 10 is a peripheral device (e.g., a peripheral device of the terminal device 100) configured to perform print function. The printer 10 comprises a housing (not shown) to which a sticker (not shown) indicating a QR code 60 (see FIG. 2) is applied. "QR Code" is a registered trademark of DENSO WAVE INCORPORATED. The printer 10 comprises an operation unit 12, a display unit 14, a Wi-Fi interface (hereafter, interface will be referred to as "I/F") 16, a print executing unit 18, and a controller 30.

The operation unit 12 comprises a plurality of keys. A user is able to input various instructions to the printer 10 by operating the operation unit 12. The display unit 14 is a display configured to display various types of information. The display unit 14 functions as a so-called touch screen (i.e., operation unit) also.

The Wi-Fi I/F 16 is a wireless interface configured to communicate wirelessly in accordance with Wi-Fi standards. The Wi-Fi standards are for communicating wirelessly in accordance with standards of 802.11 of the Institute of Electrical and Electronics Engineers, Inc. (IEEE) and its subordinate standards (e.g., 802.11a, 11b, 11g, 11n). The printer 10 is configured to establish Wi-Fi connection with the AP 6 via the Wi-Fi I/F 16 by using a service set identifier (SSID) and a password of a wireless network formed by the AP 6. The Wi-Fi I/F 16 supports Device Provisioning Protocol (DPP) scheme formulated by the Wi-Fi Alliance. The Wi-Fi I/F 16 is assigned MAC address "MACpr".

The print executing unit 18 comprises a printing mechanism such as ink jet scheme, laser scheme.

The controller 30 comprises a CPU 32 and a memory 34. The CPU 32 is configured to execute various processes in accordance with a program 36 stored in the memory 34. The memory 34 may be composed of a volatile memory, a non-volatile memory, and/or the like. The memory 34 stores therein the program 36, a first connection flag 40, a second connection flag 42, and a third connection flag 44.

The first connection flag 40 indicates a value that is either "ON" indicative of being a state of being able to establish Wi-Fi connection with another device (e.g., AP 6) according to the DPP scheme or "OFF" indicative of being a state of being unable to establish the Wi-Fi connection with another device according to the DPP scheme. The second connection flag 42 indicates a value that is either "ON" indicative of being able to establish Wi-Fi connection with another device (e.g., AP 6) according to the SoftAP scheme different from the DPP scheme or "OFF" indicative of being a state unable to establish the Wi-Fi connection with another device according to the SoftAP scheme. In the SoftAP scheme, the printer 10 which operates as a parent station of the SoftAP receives a SSID and a password of a wireless network being formed by an AP from another apparatus (e.g., PC) which is attending the wireless network being formed by the parent station of the SoftAP. The third connection flag 44 indicates a value that is either "ON" indicative of being able to establish Wi-Fi connection with another device (e.g., AP 6) according to a certificate scheme different from the DPP scheme and the SoftAP scheme or "OFF" indicative of being unable to establish the Wi-Fi connection with another device according to the certificate scheme. In the certificate scheme, the printer 10 receives an SSID and a password of a wireless network being formed by an AP from the management server 300 in response to sending a certificate to the management server 300.

(Configuration of Terminal Device 100; FIG. 1)

The terminal device 100 is a mobile terminal device such as a mobile phone (e.g., smartphone), PDA, a tablet PC. The terminal device 100 comprises a camera 115, a Wi-Fi I/F 116, and a controller 130. The Wi-Fi I/F 116 is similar to the Wi-Fi I/F 16 of the printer 10.

The controller 130 comprises a CPU 132 and a memory 134. The CPU 132 is configured to execute various processes according to programs 136, 140 stored in the memory 134. The memory 134 may be composed of a volatile memory, a non-volatile memory, and/or the like. The memory 134 stores therein an operating system (OS) program 136 and a first connection application 140. The first connection application 140 is an application for establishing a Wi-Fi connection between the printer 10 and another device (e.g., AP 6) according to the DPP scheme.

(Configuration of PC 200; FIG. 1)

The PC 200 is a stationary PC, but in a modification, the PC 200 may be a mobile device such as a laptop PC. The PC 200 comprises a Wi-Fi I/F 216 and a controller 230. The Wi-Fi I/F 216 is similar to the Wi-Fi I/F 16 of the printer 10.

The controller 230 comprises a CPU 232 and a memory 234. The CPU 232 is configured to execute various processes in accordance with programs 236, 240 stored in the memory 234. The memory 234 may be composed of a volatile memory, a non-volatile memory, and/or the like. The memory 234 stores therein the OS program 236 and the second connection application 240. The second connection application 240 is an application for establishing Wi-Fi connection between the printer 10 and another device (e.g., AP 6) according to the SoftAP scheme.

(Configuration of Management Server 300)

The management server 300 is configured to manage an SSID "S1" and a password "P1" (hereafter may be termed "AP connection information") used for a wireless network being formed by the AP 6. The management server 300 stores the AP connection information and certificate information CI in association with each other.

(Specific Cases A to E; FIGS. 2 to 6)

Subsequently, with reference to FIGS. 2 to 6, specific cases A to E implemented by the communication system 2 of the present embodiment will be described.

Figure 3:
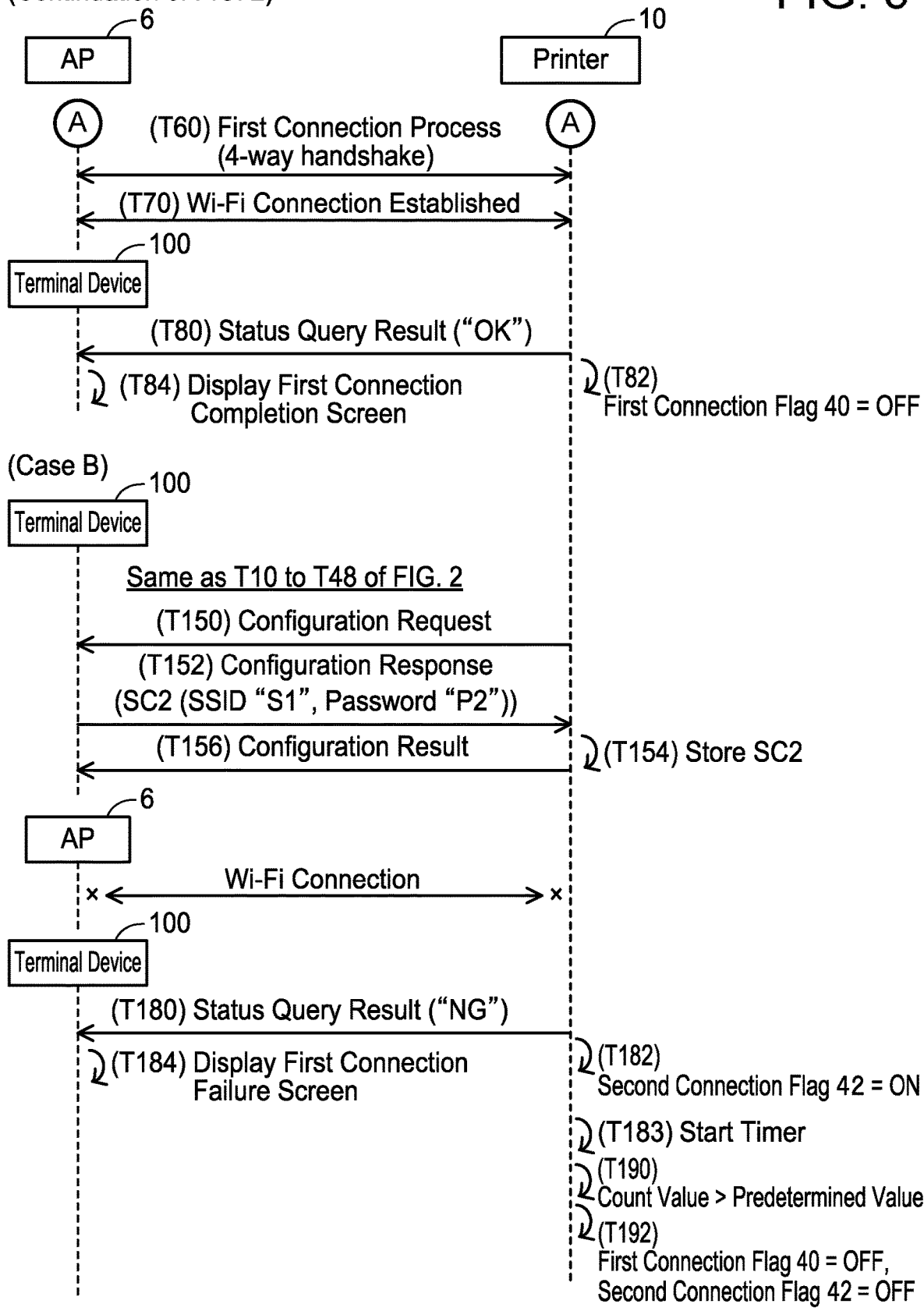
FIG. 3 is continuation of FIG. 2 and illustrates a sequence diagram of Case B in which establishment of Wi-Fi connection between the printer and the AP according to the DPP scheme fails.

(Case A; FIGS. 2 and 3)

With reference to FIGS. 2 and 3, Case A in which Wi-Fi connection is established between the printer 10 and the AP 6 according to the DPP scheme will be described. In an initial state of Case A, power of the printer 10 is off. Further, a Wi-Fi connection is established (i.e., is present) between the terminal device 100 and the AP 6 and the AP connection information (i.e., SSID "S1" and password "P1") is stored in the memory 134 of the terminal device 100. Hereinbelow, for easier understanding, operations which the CPUs (e.g., CPU 32) of the respective devices execute may be described with the respective devices (e.g., printer 10) as a subject of action instead of describing the CPU as the subject of action. Respective communications to be described later are all executed using the Wi-Fi I/F 16, 116, or 216 (see FIG. 1). Due to this, recitation "via (the) I/F" may be omitted.

The printer 10 accepts an operation of turning power of the printer 10 on in T10. Due to this, the power of the printer 10 is turned on. The printer 10 sets each of the first connection flag 40, the second connection flag 42, and the third connection flag 44 in the memory 34 "ON" in T12. In a case where at least one of the first connection flag 40 and the second connection flag 42 is "ON", the printer 10 performs Listen operation. In a case where the third connection flag 44 is "ON", the printer 10 performs search operation. Then in a case where at least one of the first and second connection flags 40 and 42 and the third connection flag 44 are "ON", the printer 10 performs the Listen operation and the search operation repeatedly. The search operation is an operation for establishing Wi-Fi connection with another device according to the certificate scheme. The printer 10 broadcasts Probe Request according to the certificate scheme in the search operation, and monitors reception of a Probe Response in response to the Probe Request. Hereafter, Request and Response will simply be termed "Req" and "Res". The Listen operation is an operation for establishing Wi-Fi connection according to the DPP scheme or the SoftAP scheme. In a case where the first connection flag 40 and the second connection flag 42 are "ON", the printer 10 monitors reception of Authentication Req according to the DPP scheme or of the Probe Req according to the SoftAP scheme. Hereafter, Authentication will simply be termed "Auth". In a case where the Auth Req is received, the printer 10 sends Auth Res according to the DPP scheme. Further, in a case where the Probe Req according to the SoftAP scheme is received, the printer 10 sends the Probe Res. In a case where the first connection flag 40 is "ON" and the second connection flag 42 is "OFF", the printer 10 monitors reception of the Auth Req in the Listen operation but does not monitor reception of the Probe Req according to the SoftAP scheme. In this case, even if the Probe Req according to the SoftAP scheme is received, the printer 10 does not send the Probe Res. Meanwhile, in a case where the first connection flag 40 is "OFF" and the second connection flag 42 is "ON", the printer 10 monitors reception of the Probe Req according to the SoftAP scheme but does not monitor reception of the Auth Req in the Listen operation. In this case, even when the Auth Req is received, the printer 10 does not send the Auth Res.

The printer 10 causes a timer to start counting in T14. The timer is for determining to change the first connection flag 40 and the second connection flag 42 to "OFF". That is, the timer is for determining to stop the Listen operation. In a case where the timer count exceeds a predetermined value (e.g., ten minutes), the printer 10 changes the first connection flag 40 and the second connection flag 42 to "OFF". In a case where the first connection flag 40 and the second connection flag 42 are "OFF", the printer 10 does not perform the Listen operation. That is, the printer 10 does not monitor the reception of the Auth Req, nor monitor the reception of the Probe Req according to the SoftAP scheme. In this case, even when the Auth Req is received, the printer 10 does not send the Auth Res, and even when the Probe Req according to the SoftAP scheme, the printer 10 does not send the Probe Res. Alternatively, in a modification, in a case where the timer count exceeds the predetermined value (e.g., ten minutes), the printer 10 may stop the Listen operation without changing the first connection flag 40 and the second connection flag 42 to "OFF".

The printer 10 broadcasts the Probe Req including an SSID "SetupAP" according to the certificate scheme in T20, due to the third connection flag 44 being "ON". In the present case, a situation where the AP 6 does not support the certificate scheme will be assumed. Due to this, the printer 10 does not receive the Probe Res in response to the Probe Req of T20. The printer 10 performs repeatedly the search operation and the Listen operation after T20.

When an operation for activating the first connection application 140 is accepted in T30, the terminal device 100 activates the first connection application 140 in T32. Next, when an operation for capturing a QR Code 60 indicated by a sticker applied on the housing of the printer 10 is accepted in T34, the terminal device 100 has the camera 115 capture the QR Code 60. The terminal device 100 decodes the QR Code 60 and thereby obtains a public key PPK1 and a MAC address "MACpr" in T36. Processes of T34 and T36 are Bootstrapping (hereafter, "BS") according to the DPP scheme executed between the terminal device 100 and the printer 10.

The terminal device 100 performs Auth with the printer 10 according to the DPP scheme by using the public key PPK1 obtained in T36, after the BS has completed. Specifically, in T40, the terminal device 100 sends to the printer 10 the Auth Req including coded data for which the public key PPK1 is used, by setting the MAC address "MACpr" obtained in T36 as a destination thereof.

When the Auth Req is received from the terminal device 100 in T40, the printer 10 authenticates the coded data included in the Auth Req. When the authentication of the coded data succeeds in T42, the printer 10 sends the Auth Res to the terminal device 100 in T44. In a case where the authentication of the coded data fails, the printer 10 does not send the Auth Res. Alternatively in a modification, in the case where the authentication of the coded data fails, the printer 10 may send an error notification to the terminal device 100. The case where the authentication of the coded data fails is when coded data is generated by using a public key different from the public key PPK1 of the printer 10. The public key different from the public key PPK1 is, for example, a public key of a printer different from the printer 10, or a public key generated by a third party. Further, the printer 10 resets the timer count and stops the counting of the timer in T45.

When the Auth Res is received from the printer 10 in T44, the terminal device 100 sends Auth Confirm to the printer 10 in T46.

When the Auth Confirm is received from the terminal device 100 in T46, the printer 10 changes the second connection flag 42 and the third connection flag 44 in the memory 34 from "ON" to "OFF" in T48. In response to the third connection flag 44 being changed from "ON" to "OFF", the printer 10 stops the search operation. That is, the printer 10 stops the broadcasting of the Probe Req according to the certificate scheme. Further, in response to the second connection flag 42 being changed from "ON" to "OFF", the printer 10 stops, among the Listen operation, the operation for establishing Wi-Fi connection with another device according to the SoftAP scheme, that is, the monitoring of reception of the Probe Req according to the SoftAP scheme. Next, the printer 10 executes Configuration (hereafter, "Config") of the DPP scheme with the terminal device 100. The Config is a process of sending information for establishing a Wi-Fi connection between the printer 10 and the AP 6 to the printer 10. The printer 10 sends Config Req to the terminal device 100 in T50. The Config Req is a signal for requesting for sending of Signed Connector (hereafter, "SC").

When the Config Req is received from the printer 10 in T50, the terminal device 100 generates SC1 including the AP connection information (i.e., SSID "S1" and password "P1") in the memory 134 and sends Config Res including the SC1 to the printer 10 in T52.

When the Config Res is received from the terminal device 100 in T52, the printer 10 stores the SC1 in the memory 34 in T54, and sends Config Result to the terminal device 100 in T56.

In T60 of FIG. 3, the printer 10 executes a first connection process for establishing the Wi-Fi connection with the AP 6 by using the AP connection information (i.e., SSID "S1" and password "P1") included in the SC1 received in T52 (FIG. 2). In the first connection process, various communications such as 4 way-handshake are performed between the printer 10 and the AP 6. In the course of the various communications, the printer 10 sends the AP connection information included in the received SC1 to the AP 6. In the present case, authentication of the password "P1" included in the AP connection information succeeds. In this case, a Wi-Fi connection is established between the printer 10 and the AP 6 in T70.

When the Wi-Fi connection has been established with the AP 6 in T70, the printer 10 sends Status Query Result including a connection result "OK" indicating that the Wi-Fi connection has been established with the AP 6 to the terminal device 100 in T80. Further, the printer 10 changes the first connection flag 40 from "ON" to "OFF" in T82. Due to this, the first connection flag 40, the second connection flag 42, and the third connection flag 44 are set "OFF". The printer 10 then stops the Listen operation. Alternatively in a modification, the printer 10 may change the first connection flag 40 from "ON" to "OFF" after T70, specifically, between T70 and T80.

When the Status Query Result is received from the printer 10 in T80, the terminal device 100 determines that the Wi-Fi connection has been established between the printer 10 and the AP 6 due to the Status Query Result including the connection result "OK" and displays a first connection completion screen in T84. The first connection completion screen includes a message indicating that a Wi-Fi connection has been established between the printer 10 and the AP 6. Due to this, the user is able to acknowledge that the Wi-Fi connection has been established between the printer 10 and the AP 6.

(Effects of Case A)

As indicated in Case A, the printer 10 changes the second connection flag 42 and the third connection flag 44 to "OFF" after the Auth Confirm has been received from the terminal device 100 and before Wi-Fi connection with the AP 6 is established (T48 of FIG. 2). A chance of failure in establishing the Wi-Fi connection between the printer 10 and the AP 6 according to the DPP scheme is lower after the Auth Confirm has been received from the terminal device 100 than after the Auth Res has been sent to the terminal device 100 and before the Auth Confirm is received from the terminal device 100. Due to this, the process according to the DPP scheme is appropriately executed by the second connection flag 42 and the third connection flag 44 being changed from "ON" to "OFF", and thus the Wi-Fi connection is established between the printer 10 and the AP.

Further, as indicated in Case A, the printer 10 changes the second connection flag 42 and the third connection flag 44 to "OFF" after the Auth Res has been sent to the terminal device 100 and before the Config Res is sent to the terminal device 100 (T48). A situation where the second connection flag 42 is not changed to "OFF" after the Auth Res has been sent to the terminal device 100 will be assumed. In this case, if the Probe Req according to the SoftAP scheme is received from another device different from the terminal device 100, the printer 10 sends Probe Res to this different device. In this case, the process for establishing the Wi-Fi connection according to the DPP scheme and the process for establishing the Wi-Fi connection according to the SoftAP scheme are executed in parallel. These processes in accordance with two different schemes may sometimes fail because they are executed in parallel. In other words, a Wi-Fi connection is not established between the printer 10 and the AP 6. Also, even if these processes according to the two different schemes do not fail, a Wi-Fi connection according to the SoftAP scheme could be established between the printer 10 and another AP different from the AP 6 after the Wi-Fi connection according to the DPP scheme has been established between the printer 10 and the AP 6. In this case, after the Wi-Fi connection according to the DPP scheme between the printer 10 and the AP 6 has been disconnected, the Wi-Fi connection according to the SoftAP scheme is established between the printer 10 and the different AP. This also applies to a case where the Probe Req according to the certificate scheme is broadcasted and the Probe Res is received after the Auth Res has been sent to the terminal device 100. According to the above configuration, after the Config Res has been sent to the terminal device 100, the process according to the SoftAP scheme and the process according to the certificate scheme are not to be executed. Due to this, failure in establishing a Wi-Fi connection according to the DPP scheme between the printer 10 and the AP 6 can be reduced. Also, in the situation where, although the Wi-Fi connection has been successfully established according to the DPP scheme between the printer 10 and the AP 6, this Wi-Fi connection according to the DPP scheme is disconnected can be reduced. Accordingly, Wi-Fi connection can be established between the printer 10 and AP.

(Case B; FIG. 3)

With reference to FIG. 3, Case B in which establishment of Wi-Fi connection between the printer 10 and the AP 6 according to the DPP scheme fails will be described. An initial state of Case B is the same as the initial state of Case A of FIGS. 2 and 3 except that an SSID "S1" and password "P2", that is information different from the AP connection information, are stored in the memory 134 of the terminal device 100.

Firstly, processes the same as T10 to T48 of FIG. 2 are performed between the printer 10 and the terminal device 100.

When the Config Req is received from the printer 10 in T150, the terminal device 100 generates SC2 including the SSID "S1" and the password "P2" in the memory 134, and sends a Config Res including the SC2 to the printer 10 in T152.

When the Config Res is received from the terminal device 100 in T152, the printer 10 stores the SC2 in the memory 34 in T154, and sends Config Result to the terminal device 100 in T156.

Next, the printer 10 performs the first connection process for establishing the Wi-Fi connection with the AP 6 by using the SSID "S1" and password "P2" included in the SC2 received in T152. In the course of the various communications in the first connection process, the printer 10 sends the SSID "S1" and the password "P2" included in the received SC2 to the AP 6. In the present case, because the password "P2" sent from the printer 10 to the AP 6 is different from the password "P1", authentication of the password "P2" fails. In this case, Wi-Fi connection is not established between the printer 10 and the AP 6.

When the establishing of Wi-Fi connection with the AP 6 fails, the printer 10 sends the Status Query Result including a connection result "NG" to the terminal device 100 in T180. Further, the printer 10 changes the second connection flag 42 from "OFF" to "ON" in T182. Here, the printer 10 does not change the third connection flag 44 from "OFF" to "ON". Further, the printer 10 causes the timer start counting in T183.

When the Status Query Result is received from the printer 10 in T180, the terminal device 100 determines that the establishing of Wi-Fi connection between the printer 10 and another device (i.e., the AP 6) has failed due to the Status Query Result including the connection result "NG" and displays a first connection failure screen in T184. The first connection failure screen includes a message indicating that the establishing of Wi-Fi connection between the printer 10 and another device has failed. Due to this, the user can acknowledge that the establishing of Wi-Fi connection between the printer 10 and another device has failed. Here, the first connection failure screen may further include a message prompting the user to use the SoftAP scheme to establish a Wi-Fi connection between the printer 10 and another device.

The printer 10 determines that the timer count has exceeded the predetermined value (e.g., ten minutes) in T190, and changes the first connection flag 40 and the second connection flag 42 from "ON" to "OFF" in T192. Here, in a case where the timer count exceeds the predetermined value (e.g., ten minutes) after the printer 10 has been turned on also, the printer 10 changes the first connection flag 40 and the second connection flag 42 from "ON" to "OFF".

Figure 4:
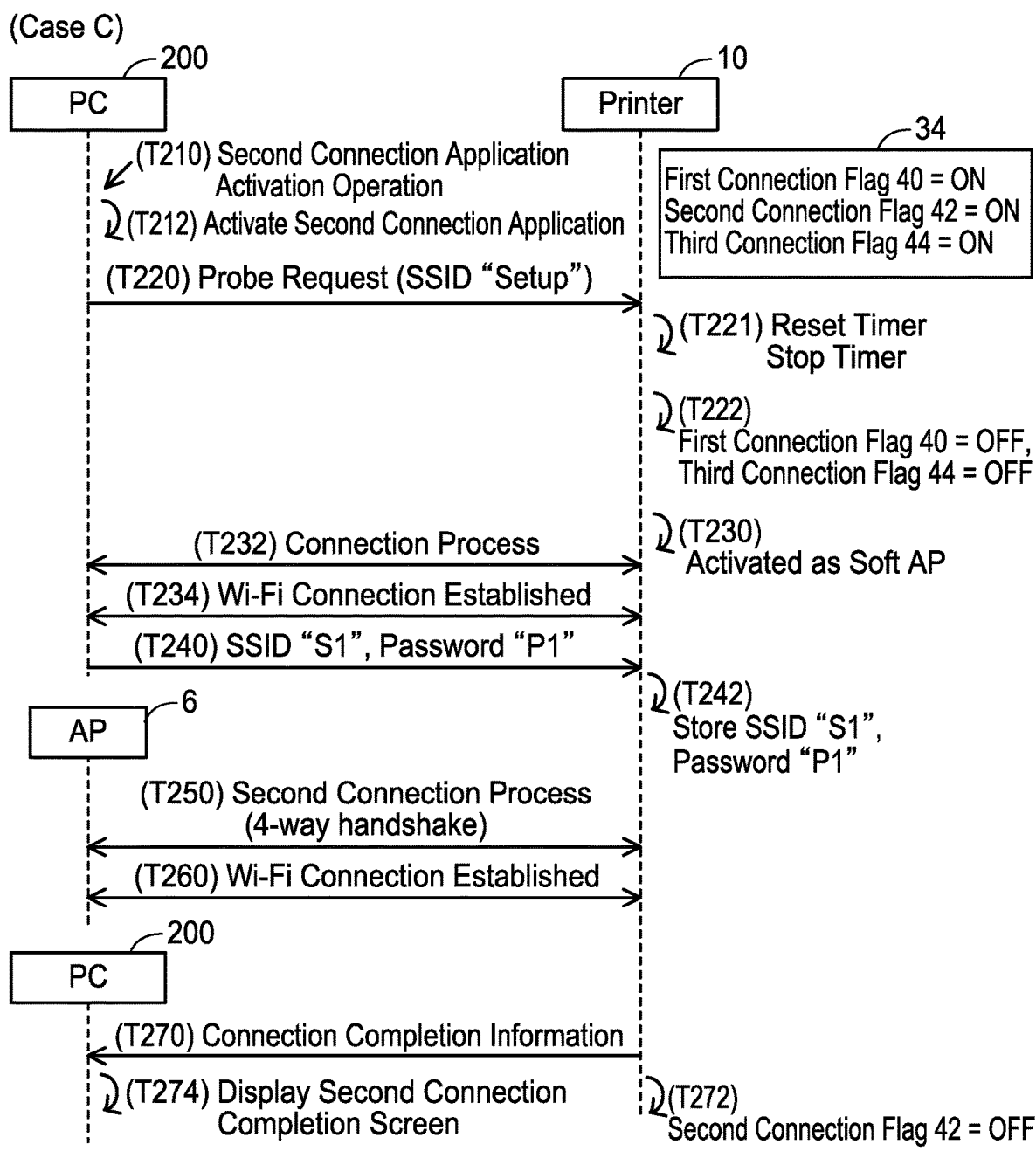
FIG. 4 illustrates a sequence diagram of Case C in which Wi-Fi connection is established between the printer and the AP according to SoftAP scheme.

(Case C; FIG. 4)

With reference to FIG. 4, Case C where Wi-Fi connection is established between the printer 10 and the AP 6 according to the SoftAP scheme will be described. An initial state of Case C is a state after T12 of Case A of FIG. 2. The AP connection information (i.e., SSID "S1" and password "P1") is stored in the memory 234 of the PC 200.

When an operation of activating the second connection application 240 is accepted in T210, the PC 200 activates the second connection application 240 in T212, and broadcasts a Probe Req including an SSID "Setup" in T220. This Probe Req is a signal for causing an apparatus configured capable of operating as SoftAP (in the present case, the printer 10) to operate as the SoftAP.

When the Probe Req is received from the PC 200 in T220, the printer 10 determines that this Probe Req includes the SSID "Setup" and establishing of Wi-Fi connection between the printer 10 and another device according to the SoftAP scheme is desired. In this case, the printer 10 resets the timer count, and stops the timer counting in T221. Further, the printer 10 changes the first connection flag 40 and the third connection flag 44 from "ON" to "OFF" in T222. In response to the third connection flag 44 being changed from "ON" to "OFF", the printer 10 stops the search operation. Also, in response to the first connection flag 40 being changed from "ON" to "OFF", the printer 10 stops an operation for, among the Listen operation, establishing Wi-Fi connection with another device according to the DPP scheme, that is, stops monitoring reception of the Auth Req. Next, the printer 10 activates as the SoftAP in T230. The printer 10 generates an SSID "S3" of wireless network formed by the printer 10 operating as the SoftAP. The printer 10 in this state operates as a parent station of the wireless network identified by the SSID "S3".

The PC 200 performs a connection process (such as 4 way-handshake) for establishing Wi-Fi connection with the printer 10 operating as the SoftAP in T232. As a result of this, a Wi-Fi connection is established between the printer 10 and the PC 200 in T234.

When the Wi-Fi connection with the printer 10 has been established, the PC 200 uses the established Wi-Fi connection and sends the AP connection information (i.e., SSID "S1" and password "P1") in the memory 234 to the printer 10 in T240.

When the AP connection information is received from the PC 200 in T240, the printer 10 stores the received AP connection information in the memory 34 and stops operating as the SoftAP in T242. Then, the printer 10 uses the AP connection information received in T240 to perform a second connection process for establishing a Wi-Fi connection with the AP 6 in T250. In the second connection process, various communications such as 4 way-handshake are performed between the printer 10 and the AP 6. In the course of the various communications, the printer 10 sends the obtained AP connection information to the AP 6. In the present case, authentication of the password "P1" included in the AP connection information succeeds. As a result of this, a Wi-Fi connection is established between the printer 10 and the AP 6 in T260.

When the Wi-Fi connection has been established with the AP 6 in T260, the printer 10 sends connection completion information including the SSID "S1" of the AP 6 to the PC 200 in T270. Further, the printer 10 changes the second connection flag 42 from "ON" to "OFF" in T272. Due to this, the first connection flag 40, the second connection flag 42, and the third connection flag 44 are set "OFF". The printer 10 then stops the Listen operation. Alternatively in a modification, the printer 10 may change the second connection flag 42 from "ON" to "OFF" after T260, specifically, between T260 and T270.

When the connection completion information is received from the printer 10 in T270, the PC 200 displays a second connection completion screen. The second connection completion screen includes a message indicating that a Wi-Fi connection has been established between the printer 10 and another device (i.e., the AP 6) and the SSID "S1". Due to this, the user is able to acknowledge that the Wi-Fi connection has been established between the printer 10 and the AP 6.

Figure 5:
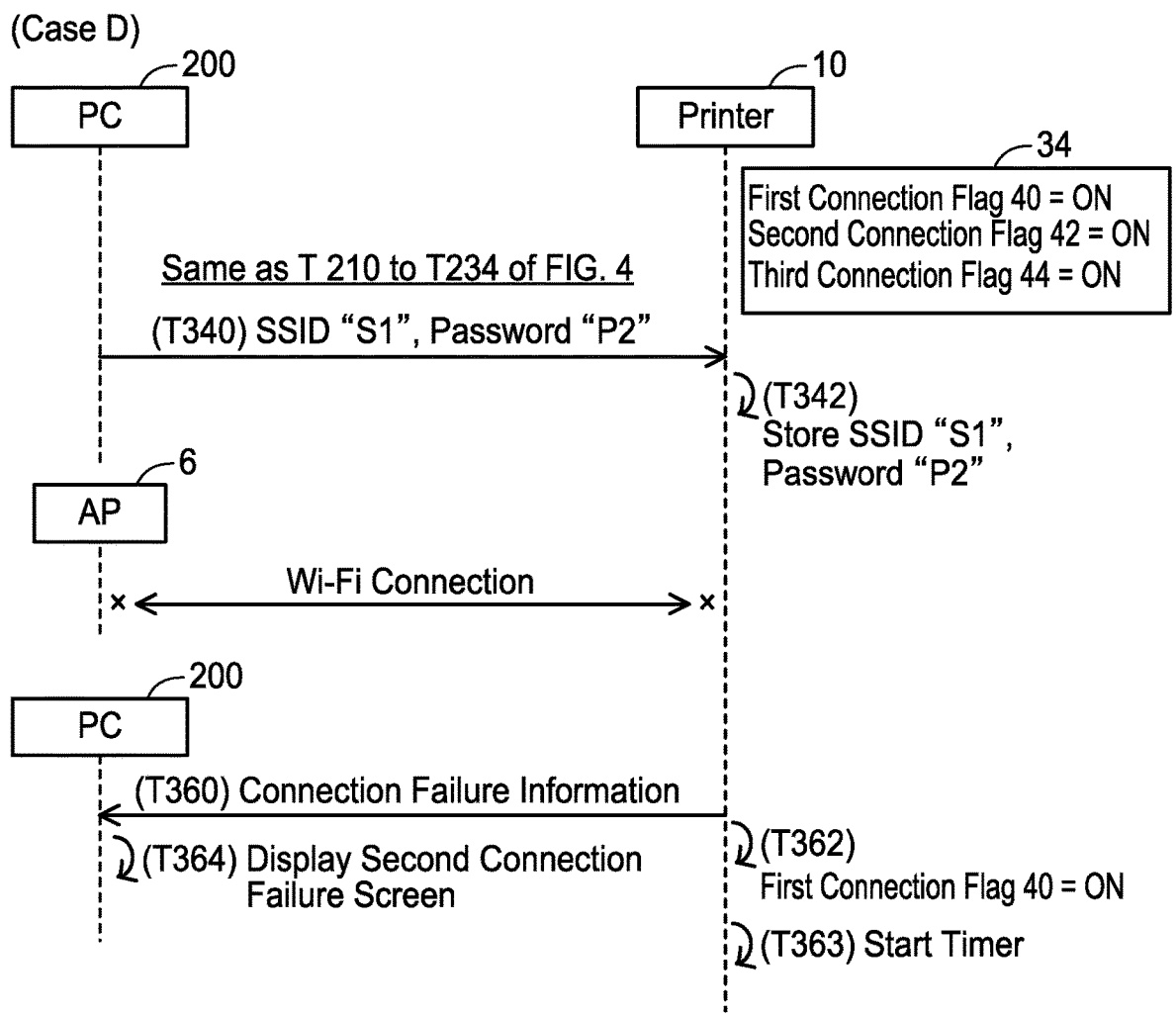
FIG. 5 illustrates a sequence diagram of Case D in which the establishment of Wi-Fi connection between the printer and the AP according to the SoftAP scheme fails.

(Case D; FIG. 5)

With reference to FIG. 5, Case D in which establishment of Wi-Fi connection according to the SoftAP scheme between the printer 10 and the AP 6 fails will be described. An initial state of Case D is the same as the initial state of Case C in FIG. 4 except that the SSID "S1" and the password "P2", that is, information different from the AP connection information, are stored in the memory 234 of the PC 200.

Firstly, processes the same as T210 to T234 of FIG. 4 are performed between the printer 10 and the PC 200. In the present case, the PC 200 sends the SSID "S1" and the password "P2" in the memory 234 to the printer 10 by using the Wi-Fi connection established between the PC 200 and the printer 10 (see T234 of FIG. 4) in T340.

When the SSID "S1" and the password "P2" are received from the PC 200 in T340, the printer 10 stores the SSID "S1" and the password "P2" in the memory 34 in T342.

Next, the printer 10 performs the second connection process for establishing Wi-Fi connection with the AP 6 by using the SSID "S1" and the password "P2" that were received in T340. In the course of the various communications in this connection process, the printer 10 sends the SSID "S1" and the password "P2" to the AP 6. In the present case, because the password "P2" sent from the printer 10 to the AP 6 is different from the password "P1", authentication of the password "P2" fails. In this case, Wi-Fi connection is not established between the printer 10 and the AP 6.

When the establishing of Wi-Fi connection with the AP 6 fails, the printer 10 sends connection failure information which does not include SSID to the PC 200 in T360. Further, the printer 10 changes the first connection flag 40 from "OFF" to "ON" in T362. Here, the printer 10 does not change the third connection flag 44 from "OFF" to "ON". Further, the printer 10 allows the timer to start counting in T363.

When the connection failure information is received from the printer 10 in T360, the PC 200 displays a second connection failure screen in T364. The second connection failure screen includes a message indicating that the establishing of Wi-Fi connection between the printer 10 and another device (i.e., the AP 6) has failed. Due to this, the user can acknowledge that the establishing of Wi-Fi connection between the printer 10 and another device has failed. Here, the second connection failure screen may include a message prompting the user to use the DPP scheme and thereby establish a Wi-Fi connection between the printer 10 and another device.

Figure 6:
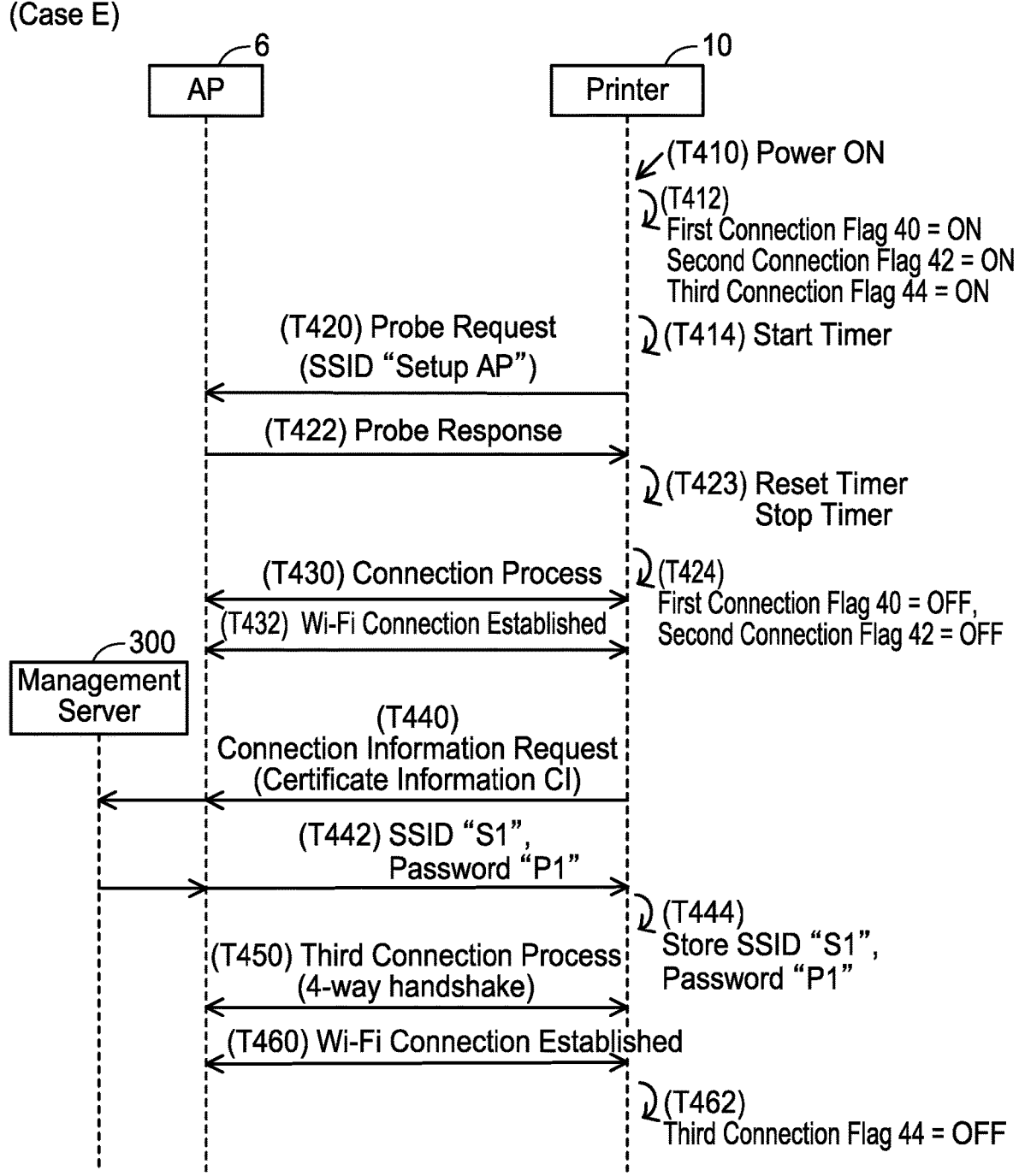
FIG. 6 illustrates a sequence diagram of Case E in which Wi-Fi connection is established between the printer and the AP according to a certificate scheme.

(Case E; FIG. 6)

With reference to FIG. 6, Case E in which Wi-Fi connection is established according to the certificate scheme between the printer 10 and the AP 6 will be described. An initial state of Case E is the same as the initial state of Case A of FIGS. 2, 3 except that the AP 6 supports the certificate scheme and the printer 10 has the certificate information CI stored (installed) therein.

T410 to T414, T420 are the same as T10 to T14, T20 of FIG. 2. Since in the present case the AP 6 supports the certificate scheme, when a Probe Req including "Setup AP" is received in T420, the AP 6 sends a Probe Res in response to the Probe Req to the printer 10 in T422. Further, the AP 6 forms wireless network which uses an SSID "Setup AP".

When the Probe Res is received in T422, the printer 10 determines that there is an AP which supports the certificate scheme, and resets the timer count and stops the count of the timer in T423, and changes the first connection flag 40 and the second connection flag 42 from "ON" to "OFF" in T424. In response to the first connection flag 40 and the second connection flag 42 being changed from "ON" to "OFF", the printer 10 stops the Listen operation. That is, the printer 10 stops monitoring reception of the Auth Req, and of reception of Probe Req according to the SoftAP scheme. The printer 10 performs a connection process for establishing Wi-Fi connection with the AP 6 having the SSID "Setup AP" in T430. As a result of this, Wi-Fi connection is established between the printer 10 and the AP 6 in T432. Next, the printer 10 sends a connection information request including the certificate information CI via the AP 6 to the management server 300 in T440.

When the connection information request is received from the printer 10 via the AP 6 in T440, the management server 300 specifies the SSID "S1" and the password "P1" (i.e., the AP connection information) stored in association with the certificate information CI in this request and sends the specified AP connection information via the AP 6 to the printer 10 in T442. Here, communication performed in T440, T442 is communication according to Hypertext Transfer Protocol (HTTP).

T444 is the same as T242 of FIG. 4. In T450, the printer 10 performs a third connection process for establishing Wi-Fi connection with the AP 6 by using the AP connection information (i.e., SSID "S1" and password "P1") received in T442. In the third connection process, various communications such as 4 way-handshake are performed between the printer 10 and the AP 6. In the course of the various communications, the printer 10 sends the AP connection information to the AP 6. In the present case, authentication of the password "P1" included in the AP connection information succeeds. In this case, Wi-Fi connection is established between the printer 10 and the AP 6 in T460.

When the Wi-Fi connection is established with the AP 6 in T460, the printer 10 changes the third connection flag 44 from "ON" to "OFF" in T462. Due to this, the first connection flag 40, the second connection flag 42, and the third connection flag 44 are all set "OFF". Then, the printer 10 stops the search operation. As such, in the case where the AP 6 supports the certificate scheme, Wi-Fi connection is automatically established between the printer 10 and the AP 6 according to the certificate scheme.

(Effects of Cases A to E)

While the printer 10 is performing the search operation, the printer 10 does not receive the Auth Req even when the Auth Req is sent from the terminal device 100. That is, even when the printer 10 is in the state of being able to perform processes according to the DPP scheme, Wi-Fi connection is not established according to the DPP scheme between the printer 10 and the AP 6. In the case where the establishing of Wi-Fi connection with the AP 6 according to the DPP scheme fails, the printer 10 sets the first connection flag 40 and the second connection flag 42 "ON" and sets the third connection flag 44 "OFF" as shown in Case B of FIG. 3 (T182). The printer 10 does not perform the search operation in the case where the third connection flag 44 is "OFF". In this case, time for which the printer 10 performs the Listen operation can be prolonged. Thus, a chance of the printer 10 receiving the Auth Req that is sent from the terminal device 100 can be increased, and also a chance of Wi-Fi connection being established according to the DPP scheme between the printer 10 and the AP 6 can be increased.

In the case where the timer count exceeds the predetermined value, that is, in the case where the time for which the first connection flag 40 and the second connection flag 42 are "ON" continues for a predetermined time, the printer 10 changes the first connection flag 40 and the second connection flag 42 to "OFF" as shown in Case B of FIG. 3. In the case where the first connection flag 40 and the second connection flag 42 are "ON", there is a possibility that a vicious third party might establish undesired Wi-Fi connection between the printer 10 and another device according to the DPP scheme or SoftAP scheme. Due to this, if the time for which the first connection flag 40 and the second connection flag 42 are "ON" is long, it increases the possibility of undesired Wi-Fi connection being established between the printer 10 and another device. According to the above configuration, as compared to the configuration where the printer 10 does not have a timer, the possibility of undesired Wi-Fi connection being established between the printer 10 and another device can be reduced, as a result of which security for the printer 10 can be improved.

Effects of Present Embodiment

As mentioned above, the printer 10 is configured to perform processes according to the DPP scheme and processes according to SoftAP scheme (or the certificate scheme). The printer 10 changes the second connection flag 42 (or the third connection flag 44) from "ON" to "OFF" (T48 of FIG. 2) after the Auth Req has been sent to the terminal device 100 (T40 of FIG. 2) and before Wi-Fi connection is established with the AP 6 (T70 of FIG. 3). That is, the printer 10 becomes unable to establish Wi-Fi connection according to the SoftAP scheme (or the certificate scheme) after the Auth Res has been sent to the terminal device 100 and before Wi-Fi connection is established with the AP 6. A chance of failure in establishing the Wi-Fi connection according to the DPP scheme between the printer 10 and the AP 6 is lower after the Auth Res has been sent to the terminal device 100 than before the Auth Res is sent to the terminal device 100. A situation where the second connection flag 42 is not changed to "OFF" after the Auth Res has been sent to the terminal device 100 will be assumed. In this case, when a Probe Req according to the SoftAP scheme is received from another device different from the terminal device 100, the printer 10 sends a Probe Res to this other device. In this case, the process for establishing Wi-Fi connection according to the DPP scheme and the process for establishing Wi-Fi connection according to the SoftAP scheme are executed in parallel. Such processes according to two different schemes may sometimes fail because they are executed in parallel. In other words, Wi-Fi connection is not established between the printer 10 and the AP 6. Also, even if these processes according to the two different schemes do not fail, Wi-Fi connection according to the SoftAP scheme could be established between the printer 10 and the other AP different from the AP 6 after the Wi-Fi connection according to the DPP scheme has been established. In this case, after the Wi-Fi connection according to the DPP scheme between the printer 10 and the AP 6 has been disconnected, the Wi-Fi connection according to the SoftAP scheme is established between the printer 10 and the different AP. This also applies to a case where a Probe Req according to the certificate scheme is broadcasted and a Probe Res is received after the Auth Res has been sent to the terminal device 100. According to the above configuration, the processes according to the DPP scheme are suitably performed because the second connection flag 42 (or the third connection flag 44) is changed from "ON" to "OFF", and thus Wi-Fi connection is established between the printer 10 and the AP 6 (T70 of FIG. 3). Further, if establishing of Wi-Fi connection with the AP 6 according to the DPP scheme fails before the second connection flag 42 (the third connection flag 44) is changed from "ON" to "OFF", the printer 10 is able to suitably perform the processes according to the SoftAP scheme (or the certificate scheme) and establish Wi-Fi connection with the AP 6 according to the SoftAP scheme (or the certificate scheme). As such, the printer 10 is able to perform processes according to the DPP scheme and processes according to the SoftAP scheme (or the certificate scheme).

(Correspondence Relationship)

The printer 10, the terminal device 100, the AP 6, and the PC 200 are respectively an example of "communication device", "first external device", "second external device", and "third external device". The Auth Req of T40 of FIG. 2 and the Auth Res of T44 of FIG. 2 are respectively an example of "authentication request" and "authentication response". The Auth Confirm in T46 of FIG. 2 is an example of "confirmation signal". The Config Req in T50 of FIG. 2 is an example of "request signal". The Wi-Fi connection in T70 of FIG. 3 is an example of "first wireless connection". The SSID "S1" and password "P1" in T52 of FIG. 2 are an example of "first wireless connection information". The Probe Req in T220 of FIG. 4 is an example of "connection request". The Wi-Fi connection in T234 of FIG. 4 is an example of "second wireless connection". The SSID "S1" and password "P1" in T240 of FIG. 4 are an example of "second wireless connection information". The Wi-Fi connection in T260 of FIG. 4 is an example of "third wireless connection".

In one aspect, the SoftAP scheme is an example of "first wireless connection scheme". The PC 200 is an example of the "third external device". The first connection flag 40="ON" and the second connection flag 42="ON" is an example of "first state". The first connection flag 40="ON" and the second connection flag 42="OFF" is an example of "second state". The first connection flag 40="OFF" and the second connection flag 42="ON" is an example of "third state". The first connection flag 40="OFF" and the second connection flag 42="OFF" is an example of "fifth state", "sixth state".

In another aspect, the certificate scheme and the SoftAP scheme are respectively an example of "first wireless connection scheme" and "second wireless connection scheme". The first connection flag 40="ON" and the third connection flag 44="ON" is an example of the "first state". The first connection flag 40="ON" and the third connection flag 44="OFF" is an example of the "second state". The first connection flag 40="ON", the second connection flag 42="ON", and the third connection flag 44="ON" is an example of the "first state". The first connection flag 40="OFF", the second connection flag 42="OFF", and the third connection flag 44="OFF" is an example of the "second state". The first connection flag 40="ON", the second connection flag 42="ON", and the third connection flag 44="OFF" is an example of the "fourth state". The Probe Req in T420 of FIG. 6 and Probe Res in T422 of FIG. 6 are respectively an example of "search signal" and "search response". The Wi-Fi connection in T450 of FIG. 6 is an example of "fourth wireless connection". The first connection flag 40="OFF" and the third connection flag 44="ON" is an example of the "third state".

T40 to T46, T50 to T56, and T60 in FIG. 2 are an example of process by "execute a first process". T42 in FIG. 2 is an example of process by "receiving an authentication request". T44 in FIG. 2 is an example of process by "sending an authentication response". T60 in FIG. 2 is an example of process by "establishing a first wireless connection". T12, T48 in FIG. 2 are an example of process by "shift the state of the communication device from the first state to a second state". In one aspect, T220, T222, T230 to T250 in FIG. 4 are an example of process by "execute a second process". In another aspect, T420 to T450 of FIG. 6 are an example of process by "execute a second process".

SECOND EMBODIMENT: FIG. 7

Next, a second embodiment will be described. Description for points similar to that of the first embodiment may be omitted. In the present embodiment, a sticker indicating the QR Code 60 is not applied on the housing of the printer 10.

(Case F)

Figure 7:
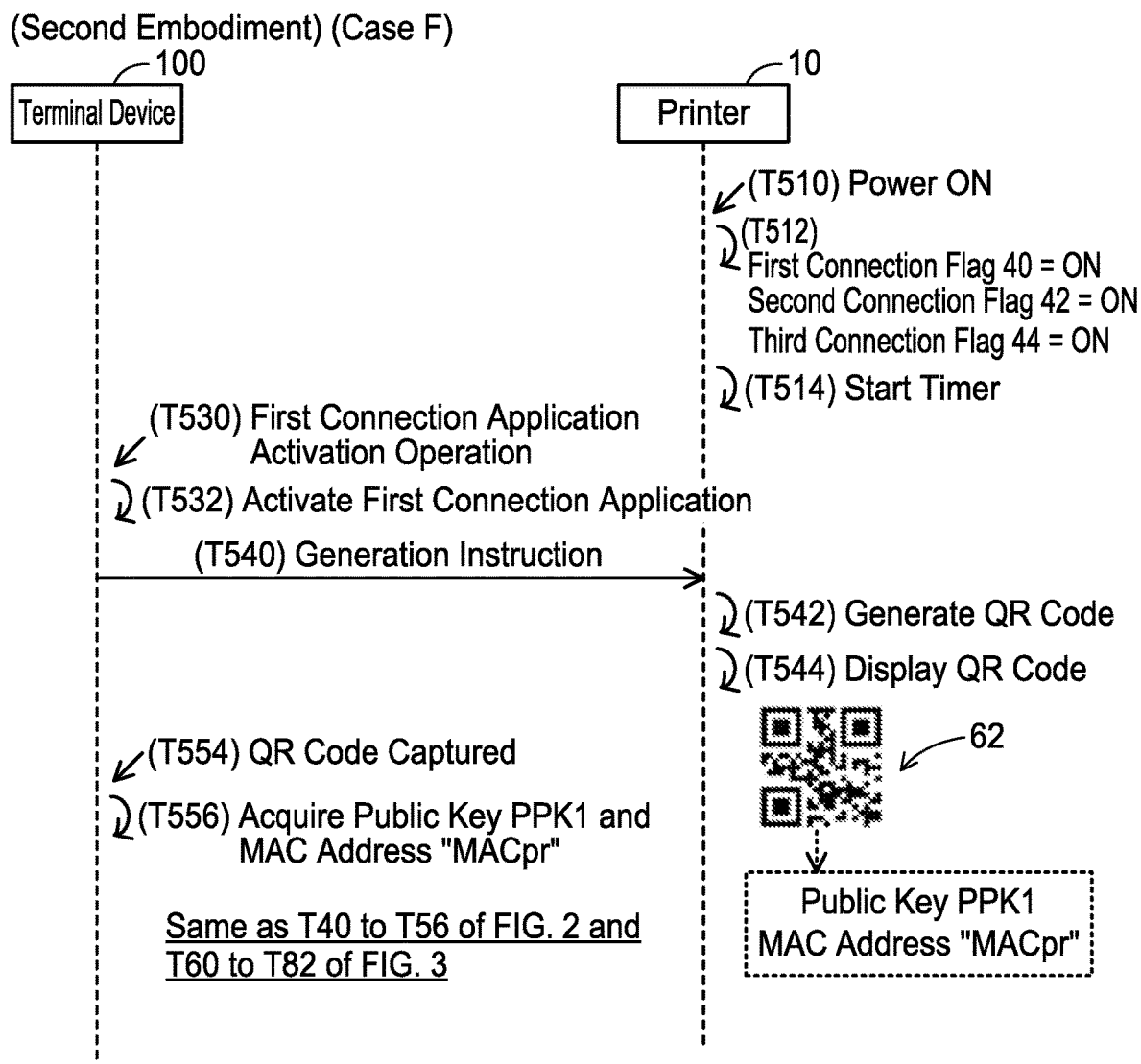
FIG. 7 illustrates a sequence diagram of Case F in which Wi-Fi connection is established between the printer and the AP according to the DPP scheme in a second embodiment.

With reference to FIG. 7, Case F in which Wi-Fi connection is established according to the DPP scheme between the printer 10 and the AP 6 will be described. An initial state of Case F is the same as the initial state of Case A in FIGS. 2, 3.

T510 to T514, T530, T532 are respectively the same as T10 to T14, T30, T32 in FIG. 2. When the first connection application 140 is activated, the terminal device 100 sends a generation instruction to the printer 10 in T540. The generation instruction is a signal for instructing to generate a QR Code which is obtained by coding a public key.

When the generation instruction is received from the terminal device 100 in T540, the printer 10 generates a QR Code 62 and displays the QR Code 62 in T542. The QR Code 62 is the one obtained by coding the same character string as that of the QR Code 60 (i.e., public key PPK1 and MAC address "MACpr") in the first embodiment (see FIG. 2). Alternatively in a modification, the printer 10 may cause the print executing unit 18 to print image data including the generated QR Code 62.

T554, T556 are respectively the same as T34, T36 in FIG. 2. Thereafter, processes similar to T40 to T56 in FIGS. 2 and T60 to T82 in FIG. 3 are performed. That is, Wi-Fi connection is established according to the DPP scheme between the printer 10 and the AP 6 (see T70 of FIG. 3). According to such configuration also, the same effect as that of the first embodiment can be brought forth.

(First Modification) The printer 10 may support only one of the SoftAP scheme and the certificate scheme. Further in another modification, the printer 10 may also support Wi-Fi Protected Setup (WPS) scheme formulated by the Wi-Fi Alliance. In the present modification, each of the SoftAP scheme, the certificate scheme, and the WPS scheme is an example of the "first connection scheme". Further, in another modification, the printer 10 may be configured to operate according to Wi-Fi Direct (WFD in short) scheme (example of the "first connection scheme") instead of the SoftAP scheme. In the present modification, the printer 10 monitors reception from another device of a request signal requesting to operate as Group Owner of the WFD scheme (e.g., Probe Req including SSID "Setup") (example of "connection request") in the case where the second connection flag 42 is "ON". "Wi-Fi Direct" is a registered trademark of Wi-Fi Alliance.

In a case where this request signal is received from another device (e.g., the terminal device 100), the printer 10 operates as Group Owner of the WFD scheme and establishes WFD connection (example of "second wireless connection") with the other device (e.g., the terminal device 100). The printer 10 then uses the WFD connection and receives the AP connection information (i.e., SSID "S1" and password "P1") from the other device.

(Second Modification) In Case A of FIGS. 2, 3, the printer 10 establishes Wi-Fi connection with the AP 6 by performing the first connection process. Instead of this, the printer 10 may establish Wi-Fi connection with the AP 6 by performing Network Access (hereafter, "NA") of the DPP scheme. In the present modification, the AP 6 supports the DPP scheme, and has a QR Code indicating a public key of the AP 6 (e.g., sticker applied on the housing of the AP 6). The terminal device 100 obtains the public key of the AP 6 by capturing the QR Code (that is, performs BS). Thereafter, the terminal device 100 performs Auth and Config with the AP 6. Notably here, the terminal device 100 generates SC for AP in the Config, and sends the SC for AP to the AP 6. The terminal device 100 and the AP 6 thus use the SC for AP to perform the NA, thereby sharing a connection key and establishing Wi-Fi connection by using the connection key. Thereafter, the terminal device 100 performs BS, Auth, and Config (T40 to T56) with the printer 10. Notably here, the terminal device 100 generates SC for printer which does not include the SSID and password of the AP 6 in Config and sends the SC for printer to the printer 10. In this case, the printer 10 and the AP 6 thus use the SC for printer and the SC for AP to perform the NA, thereby sharing a connection key and establishing Wi-Fi connection by using the connection key. In the present modification, the SC for printer is an example of the "first wireless connection information".

(Third Modification) In Case A of FIGS. 2, 3, the timing when the printer 10 changes the second connection flag 42 and the third connection flag 44 from "ON" to "OFF" is not limited to between T46 and T50. For example, the printer 10 may change the second connection flag 42 and the third connection flag 44 from "ON" to "OFF" between T44 and T46, and may change the second connection flag 42 and the third connection flag 44 from "ON" to "OFF" between T50 in FIGS. 2 and T70 in FIG. 3. In other words, the printer 10 simply needs to change the second connection flag 42 and the third connection flag 44 from "ON" to "OFF" after the Auth Res has been sent to the terminal device 100 and before Wi-Fi connection is established with the AP 6.

(Fourth Modification) In Case C of FIG. 4, the timing when the printer 10 changes the first connection flag 40 and the third connection flag 44 from "ON" to "OFF" is not limited to between T220 and T230. The printer 10 may change the first connection flag 40 and the third connection flag 44 from "ON" to "OFF" between T220 and T260. In other words, the printer 10 simply needs to change the first connection flag 40 and the third connection flag 44 from "ON" to "OFF" after the Probe Req has been received from the PC 200 and before Wi-Fi connection is established with the AP 6.

(Fifth Modification) In Case E of FIG. 6, the timing when the printer 10 changes the first connection flag 40 and the second connection flag 42 from "ON" to "OFF" is not limited to between T422 and T430. The printer 10 simply needs to change the first connection flag 40 and the second connection flag 42 from "ON" to "OFF" between T422 and T450. In other words, the printer 10 simply needs to change the first connection flag 40 and the second connection flag 42 from "ON" to "OFF" after the Probe Res has been received from the AP 6 and before Wi-Fi connection is established with the AP 6.

(Sixth Modification) In Case B of FIG. 3, in the case where Wi-Fi connection according to the DPP scheme with the AP 6 fails, the printer 10 may change the second connection flag 42 and the third connection flag 44 from "OFF" to "ON". In another modification, in Case D of FIG. 5, in the case where Wi-Fi connection according to the SoftAP scheme with the AP 6 fails, the printer 10 may change the first connection flag 40 and the third connection flag 44 from "OFF" to "ON".

(Seventh Modification) In Case B of FIG. 3, in the case where establishing of Wi-Fi connection according to the DPP scheme with the AP 6 fails, the printer 10 may change the second connection flag 42 from "OFF" to "ON", and may change the first connection flag 40 from "ON" to "OFF". Also in another modification, in Case D of FIG. 5, in the case where establishing of Wi-Fi connection according to the SoftAP scheme with the AP 6 fails, the printer 10 may change the first connection flag 40 from "OFF" to "ON", and may change the second connection flag 42 from "ON" to "OFF".

(Eighth Modification) In the case where the timer count exceeds a predetermined value with the first connection flag 40, the second connection flag 42, and the third connection flag 44 being "ON", the printer 10 may change the first connection flag 40, the second connection flag 42, and the third connection flag 44 from "ON" to "OFF". Further in another modification, in the case where the timer count exceeds a predetermined value with the first connection flag

40, the second connection flag 42, and the third connection flag 44 being "ON", the printer 10 may change one flag of, or two flags of the first connection flag 40, the second connection flag 42, and the third connection flag 44 from "ON" to "OFF". Further, in another modification, the printer 10 may not comprise a timer.

(Ninth Modification) The "communication Device" may not be the printer 10, but may be another device such as scanner, multi-function peripheral, mobile terminal, PC, or server.

(Tenth Modification) Although in each of the above embodiments, each of the processes in FIGS. 2 to 7 is executed by software, at least of these processes may be performed by hardware such as a logic circuit.

What is claimed is:

1. A communication device comprising:
a controller configured to:
execute a first process according to a Device Provisioning Protocol (DPP) scheme;
execute a second process according to a first wireless connection scheme different from the DPP scheme; and
shift a state of the communication device,
wherein the first process includes:
under a situation where the state of the communication is a first state of being able to establish wireless connection with a different device according to the DPP scheme and being able to establish wireless connection with a different device according to the first wireless connection scheme, receiving an authentication request in which a public key of the communication device is used from a first external device;
in a case where the authentication request is received from the first external device, sending an authentication response to the first external device; and
in a case where the authentication response is sent to the first external device, establishing a first wireless connection with a second external device,
wherein the controller is configured to, shift the state of the communication device from the first state to a second state after the authentication response has been sent to the first external device and before the first wireless connection is established with the second external device, and
wherein the second state is a state of being able to establish wireless connection with a different device according to the DPP scheme and being unable to establish wireless connection with a different device according to the first wireless connection scheme.

2. The communication device as in claim 1, wherein the first process further includes, receiving a confirmation signal from the first external device after the authentication response has been sent to the first external device, the confirmation signal indicating that the authentication response has been received,
wherein the controller is configured to shift the state of the communication device from the first state to the second state after the confirmation signal has been received from the first external device and before the first wireless connection is established with the second external device.

3. The communication device as in claim 1, wherein the first process further includes sending a request signal to the first external device after the authentication response has been sent to the first external device, the request signal being for requesting the first external device to send first wireless connection information,
wherein the controller is configured to:
establish the first wireless connection with the second external device by using the first wireless connection information received from the first external device in response to the request signal being sent to the first external device, and
shift the state of the communication device from the first state to the second state after the authentication response has been sent to the first external device and before the request signal is sent to the first external device.

4. The communication device as in claim 1, wherein the second process includes:
under a situation where the state of the communication device is the first state, receiving a connection request from a third external device;
in a case where the connection request is received from the third external device, establishing second wireless connection with the third external device;
in a case where the second wireless connection is established with the third external device, receiving second wireless connection information from the third external device by using the second wireless connection; and
in a case where the second wireless connection information is received from the third external device, establishing third wireless connection with the second external device by using the second wireless connection information,
wherein the controller is configured to shift the state of the communication device from the first state to a third state after the connection request has been received from the third external device and before the third wireless connection is established with the second external device, and
wherein the third state is a state of being unable to establish wireless connection with a different device according to the DPP scheme and being able to establish wireless connection with a different device according to the first wireless connection scheme.

5. The communication device as in claim 1, wherein the second process includes:
sending a search signal for searching for the second external device under a situation where the state of the communication device is the first state;
in response to the search signal being sent, receiving a search response from the second external device; and
in a case where the search response is received from the second external device, establishing fourth wireless connection with the second external device,
wherein the controller is configured to shift the state of the communication device from the first state to a third state after the search response has been received from the second external device and before the fourth wireless connection is established with the second external device, and
wherein the third state is a state of being unable to establish wireless connection with a different device according to the DPP scheme and being able to establish wireless connection with a different device according to the first wireless connection scheme.

6. The communication device as in claim 5, wherein the controller is further configured to execute a third process according to a second wireless connection scheme different from the DPP scheme and the first wireless connection scheme, the first state is a state of being further able to establish wireless connection with a different device according to the second wireless connection scheme, wherein the third process includes:
- receiving a connection request from a third external device under the situation where the state of the communication device is the first state;
- in a case where the connection request is received from the third external device, establishing second wireless connection with the third external device;
- in a case where the second wireless connection is established with the third external device, receiving second wireless connection information from the third external device by using the second wireless connection; and
- in a case where the second wireless connection information is received from the third external device, establishing third wireless connection with the second external device by using the second wireless connection information, wherein the second state is a state of being further unable to establish wireless connection with a different device according to the second wireless connection scheme, wherein the controller is configured to shift the state of the communication device from the second state to a fourth state in a case where establishing of the first wireless connection with the second external device fails, and wherein the fourth state is a state of being able to establish wireless connection with a different device according to the DPP scheme, of being unable to establish wireless connection with a different device according to the first wireless connection scheme, and of being able to establish wireless connection with a different device according to the second wireless connection scheme.

7. The communication device as in claim 1, wherein the controller is configured to shift the state of the communication device from the second state to the first state in a case where establishing of the first wireless connection with the second external device fails.

8. The communication device as in claim 1, further comprising a housing on which a sticker indicating a code image is applied,
wherein the code image is obtained by coding the public key.

9. The communication device as in claim 1, further comprising an output unit,
wherein the controller is further configured to, in a case where an output instruction for instructing an output of the public key is obtained, cause the output unit to output a code image that is obtained by coding the public key.

10. The communication device as in claim 1, wherein the controller is further configured to, in a case where a situation under which the state of the communication device is the first state continues for a predetermined time period, shift the state of the communication device from the first state to a fifth state, and
the fifth state is a state of being unable to establish wireless connection with a different device according to the DPP scheme and of being able or unable to establish wireless connection with a different device according to the first wireless connection scheme.

11. The communication device as in claim 1, wherein the controller is configured to, in a case where a situation under which the state of the communication device is the first state continues for a predetermined time period, shift the state of the communication device from the first state to a sixth state, and
the sixth state is a state of being able or unable to establish wireless connection with a different device according to the DPP scheme and of being unable to establish wireless connection with a different device according to the first wireless connection scheme.

12. A non-transitory computer-readable recording medium storing computer-readable instructions for a communication device,
wherein the communication device comprises:
a processor,
wherein the computer-readable instructions, when executed by the processor, cause the communication device to:
execute a first process according to a Device Provisioning Protocol (DPP) scheme;
execute a second process according to a first wireless connection scheme different from the DPP scheme; and
shift a state of the communication device,
wherein the first process includes:
- under a situation where the state of the communication is a first state of being able to establish wireless connection with a different device according to the DPP scheme and being able to establish wireless connection with a different device according to the first wireless connection scheme, receiving an authentication request in which a public key of the communication device is used from a first external device;
- in a case where the authentication request is received from the first external device, sending an authentication response to the first external device; and
- in a case where the authentication response is sent to the first external device, establishing first wireless connection with a second external device, wherein the controller is configured to shift the state of the communication device from the first state to a second state after the authentication response has been sent to the first external device and before the first wireless connection is established with the second external device, and wherein the second state is a state of being able to establish wireless connection with a different device according to the DPP scheme and being unable to establish wireless connection with a different device according to the first wireless connection scheme.

* * * * *